United States Patent Office 3,010,828
Patented Nov. 28, 1961

3,010,828
SOAP IN ANIMAL FEED
Eugene B. Patterson, Park Forest, Robert E. Gray, Palos Heights, and Eldon E. Rice, Palos Park, Ill., assignors to Swift & Company, Chicago, Ill., a corporation of Illinois
No Drawing. Filed May 22, 1957, Ser. No. 660,763
3 Claims. (Cl. 99—2)

The present invention relates to an improved animal feed, and more particularly is directed to the use of soap as an energy source in animal feeds.

In recent years, a considerable interest has developed in so-called "high energy" feeds. The energy value of a particular ration is important because—up to a certain point—the more energy an animal receives, the faster it will grow, provided the feed nutrients are in proper balance. The gross energy content of a ration is defined as the number of Calories produced per gram of completely oxidized feed. A Calorie is the amount of heat required to raise a kilogram (1,000 grams) of water 1° C. Productive energy is that energy in a feed which can be utilized for growth or for growth and egg production in the case of poultry.

The following table shows the approximate Caloric content of certain feed materials.

Feedstuff: Calories per lb.
Fat _____ 2,900
Corn _____ 1,140
Wheat _____ 1,025
Barley _____ 810
Oats _____ 760
Fish meal (64% protein) _____ 890
Meat scrap (50% protein) _____ 850
Soybean oil meal (43%) _____ 675
Corn gluten meal _____ 840

Inasmuch as fats contain approximately two and one-half times as many Calories per gram as do carbohydrates and proteins, they have frequently been added to conventional rations to produce high energy feeds. Under certain conditions, fat concentrations as high as about 15 percent or more have significantly improved the growth-producing abilities of conventional poultry and hog rations.

Feeds containing high fat concentrations, however, create certain problems which substantially discourage their use in commercial operations. When the level of fat added to a feed exceeds 2-3 percent, for example, the product becomes greasy and tends to stain packages. Even more important in modern poultry and livestock feeding is the fact that feeds containing more than about 5 percent total fat are difficult, if not impossible, to pellet.

It is, therefore, an object of the present invention to provide a feed having a high fat content which can be pelleted.

Another object of the invention is to provide high energy feeds which are not greasy and which do not stain packages.

Other objects not specifically set forth will become readily apparent to one skilled in the art from the following detailed description of the invention.

Generally, the present invention involves adding salts of high molecular weight fatty acids (soaps) to animal feeds in order to provide a high energy product. It has been found that feeds having a soap content or a combined soap and fat content of 15 percent or more can be pelleted and will have a relatively lustrous, dust-free, and non-oily appearance. Sodium soaps have been found to be particularly advantageous for this purpose.

The following examples are illustrative of the present invention and are not to be considered as restrictive thereof.

Example I

Groups of chicks were test-fed rations containing various levels of fat and soap to the age of nine weeks. The results of the test are as follows:

| Fat added to conventional diet | Weight at 9 weeks, lbs. | Pounds of feed used per pound gain, lbs. |
|---|---|---|
| Lot 1, 0 | 3.28 | 2.31 |
| Lot 2, 3% tallow | 3.18 | 2.24 |
| Lot 3, 7.5% tallow | 3.25 | 2.14 |
| Lot 4, 10% tallow | 3.24 | 2.09 |
| Lot 5, 7.00% tallow—3.41% soap [1] | 3.34 | 2.14 |
| Lot 6, 5.00% tallow—5.68% soap [1] | 3.23 | 2.13 |
| Lot 7, 11.36% soap [1] | 3.26 | 2.12 |

[1] Equivalent to 3, 5, and 10% fat supplied as 41–42 titer sodium tallow soap.

It is apparent from the above results that soap is approximately equal to tallow as an energy source. The chicks fed rations 5, 6 and 7 were as healthy in their appearance as were the chicks fed rations 1 through 4.

Example II

Several groups of broilers were raised on diets which included various amounts of tallow and soap in order to again evaluate the relative effectiveness of tallow and soap as energy sources:

| Treatment | Average 8-week body weights and feed conversion ratios | | |
|---|---|---|---|
| | Diet 1 | Diet 2 | Diet 3 |
| | 10% tallow | 11.36% soap | 11.36% soap and salts |
| Males: | | | |
| Weight | 3.36 | 3.15 | 3.15 |
| F.C. | 1.96 | 2.02 | 1.96 |
| Females: | | | |
| Weight | 2.69 | 2.61 | 2.55 |
| F.C. | 2.00 | 1.98 | 1.99 |
| Average Weight | 3.02 | 2.88 | 2.85 |
| Average F.C. | 1.98 | 2.00 | 1.98 |

The above data further substantiates the fact that soap is a satisfactory substitute for tallow as an energy source. In Diet 3 the mineral content of the ration was altered by eliminating salt and rock phosphate from the feed in order to prevent the development of an alkalosis condition which might appear in birds fed diets containing 10% or more soap due to the presence of excess sodium. The calcium and chloride eliminated along with sodium was replaced by adding $Ca(H_2PO_4)_2$ (2.0% by weight) and ammonium chloride (0.5% by weight) to the ration.

Example III

In the past, it was felt that soap would be toxic to animals if taken in significant amounts and would cause diarrhea and other maladies. Tests were made of the droppings from poultry fed soap-containing feeds for ten (10) days to evaluate this prior art belief.

| | Soap percent | Tallow percent | Droppings consistency |
|---|---|---|---|
| Lot 1 | 3.41 | 7.0 | Normal. |
| Lot 2 | 4.54 | 6.0 | Do. |
| Lot 3 | 5.68 | 5.0 | Do. |
| Lot 4 | 6.81 | 4.0 | 10–15% loose. |

Droppings from poultry fed rations 1, 2, and 3 were normal. In addition, even though the droppings from poultry fed a ration containing 6.81% soap and 4% tallow were loose, the birds prospered and showed no adverse effects from this diet.

Example IV

One of the major deficiencies in feeds containing high levels of fat lies in the fact that they are almost impossible to pellet. In order to demonstrate one advantage gained in using soap as a substitute for other fatty materials, 5 lots of feed containing various combinations of soap and tallow were pelleted in a commercial feed-pelleting plant.

| Lot | Soap, percent | Tallow, percent |
|---|---|---|
| 1 | 3.41 | 7 |
| 2 | 4.54 | 6 |
| 3 | 5.68 | 5 |
| 4 | 6.81 | 4 |
| 5 | 2.84 | 5 |

Contrary to results obtained from other high fat content feeds, each of the above lots (200 pounds per lot) pelleted without difficulty.

Example V

The physical appearance of a feed is important in fixing its commercial value. In particular, a feed should have a high luster and a non-oily appearance and should be relatively dust-free. The below-listed feed lots were prepared by adding combinations of soap and tallow at a 10% level to a feed complete in every nutrient but fat:

| Lot | Soap, percent | Tallow, percent |
|---|---|---|
| 1 |  | 10 |
| 2 | 1.15 | 9 |
| 3 | 2.27 | 8 |
| 4 | 3.41 | 7 |
| 5 | 4.54 | 6 |
| 6 | 5.68 | 5 |
| 7 | 6.81 | 4 |
| 8 | 7.95 | 3 |
| 9 | 11.36 |  |

Although Lot 9 was somewhat dusty and light in color, Lots 3 through 8 were dust-free and had a non-oily appearance. These lots also had a relatively high luster. In contrast, Lots 1 and 2 were dark in color and felt greasy to the touch.

The feed conversion of a particular ration is defined as the number of pounds of feed it takes to produce a pound of weight in the animal. This property of a ration is particularly important and often determines whether a particular operation is to be profitable or unprofitable. The feed conversion ratio of a ration is compared with its cost in order to determine its commercial feasibility. As is indicated in the above examples, feeds containing soaps have a low feed conversion ratio and therefore are used to advantage so long as the cost of the feed ingredients are not such as to over-balance the increase in feed efficiency. For this reason, soaps prepared from tallow and other inexpensive and readily available fats are preferably employed in the subject product and process.

The teaching of the subject invention is applicable in all instances wherein a high-energy feed is desired. Examples of the numerous standard formulas for poultry feed can be found in reference books such as "Successful Poultry Management," Jull, pages 232–234. Suggested hog feed formulas can be found in similar textbooks.

The present invention provides high-energy feeds which compare favorably with rations containing tallow, soybean oil, and other triglycerides from a growth-producing standpoint and yet have the significant advantages of pelletability and freedom from package staining, among others. Contrary to established beliefs, feeds containing high levels of soap proved to be non-toxic and were readily utilized by the test animals.

Obviously many modifications and variations of the invention as hereinbefore set forth may be made without departing from the spirit and scope thereof, and therefore only such limitations should be imposed as are indicated in the appended claims.

We claim:
1. An improved high energy and pelletable complete animal feed containing at least about 2.5 percent sodium soap and a sufficient additional amount of fatty material to raise the fat content of the final product to at least about 7.5 percent, said amounts being based on the total weight of said complete feed product.

2. A method of increasing the energy value of complete animal feeds which comprises: adding a first quantity of sodium soap to said feeds, and adding a second quantity of additional fatty material to said feeds, said first quantity constituting at least about 2.5% of the final complete feed product and said second quantity being sufficient to bring the total fat content of the final complete feed product to at least about 7.5%.

3. A method of increasing the energy value of complete animal feeds which comprises: adding a first quantity of sodium soap to said feeds, and adding a second quantity of additional fatty material to said feeds, said first quantity constituting at least about 2.5 percent of the final complete feed product and said second quantity being sufficient to bring the total fat content of the final complete feed product to at least above about 10 percent.

References Cited in the file of this patent

UNITED STATES PATENTS

| | | |
|---|---|---|
| 2,746,864 | Pack et al. | May 22, 1956 |
| 2,835,584 | Rosenberg | May 20, 1958 |
| 2,899,308 | Ely et al. | Aug. 11, 1959 |
| 2,903,355 | Belasco | Sept. 8, 1959 |
| 2,939,790 | Clayton | June 7, 1960 |

OTHER REFERENCES

Ault et al.: Chemurgic Digest, December 1954, pp. 4, 5 and 19.

Pack et al.: Jr. of Am. Oil Chem. Soc., Nov. 1955, pp. 551–3.